Figure 1:
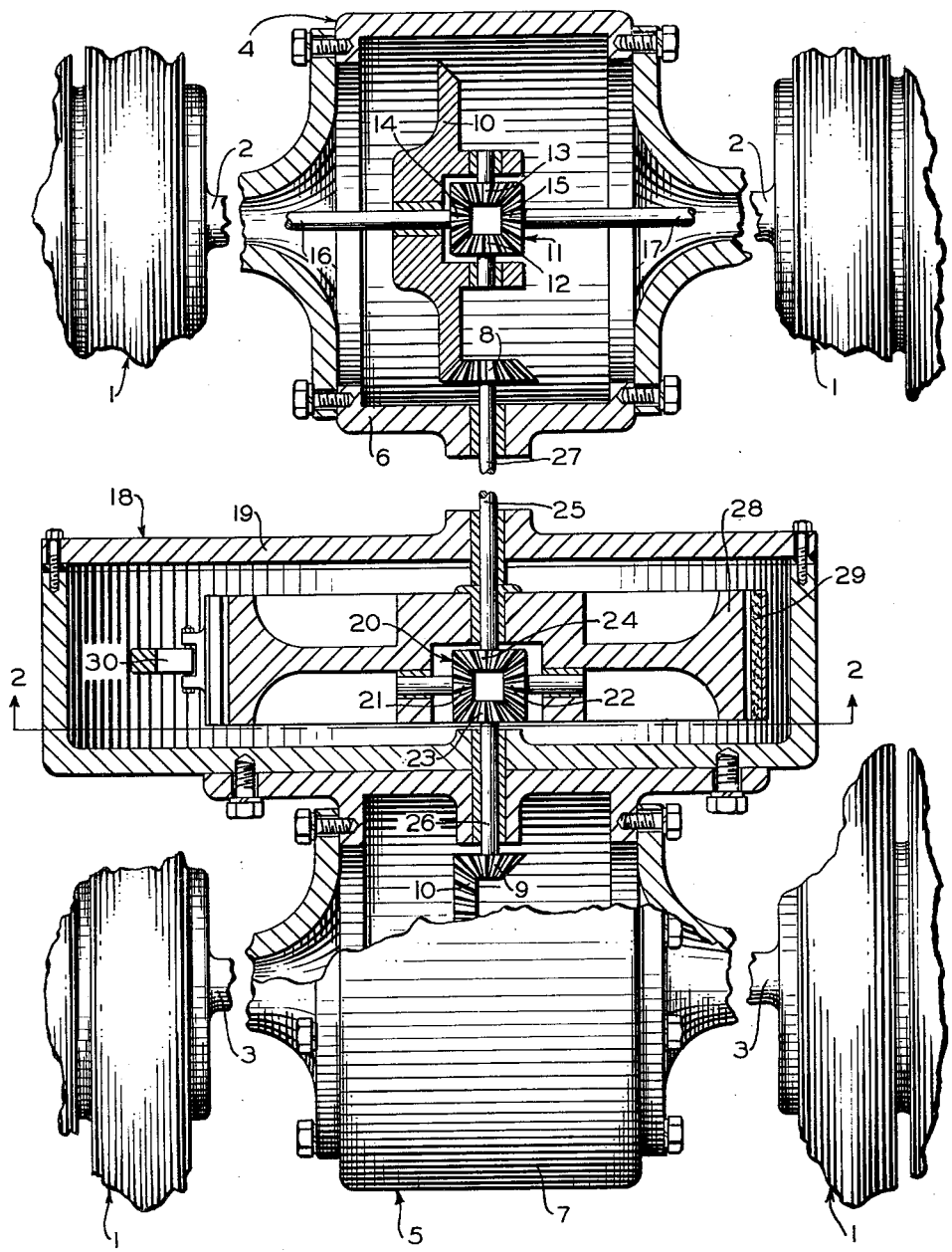

Aug. 29, 1961 R. M. KENDIG 2,998,101
SAFETY BRAKE APPARATUS FOR TANDEM AXLE TRAILERS
Filed March 19, 1957 2 Sheets-Sheet 1

INVENTOR.
Robert M. Kendig
BY
ATTORNEY

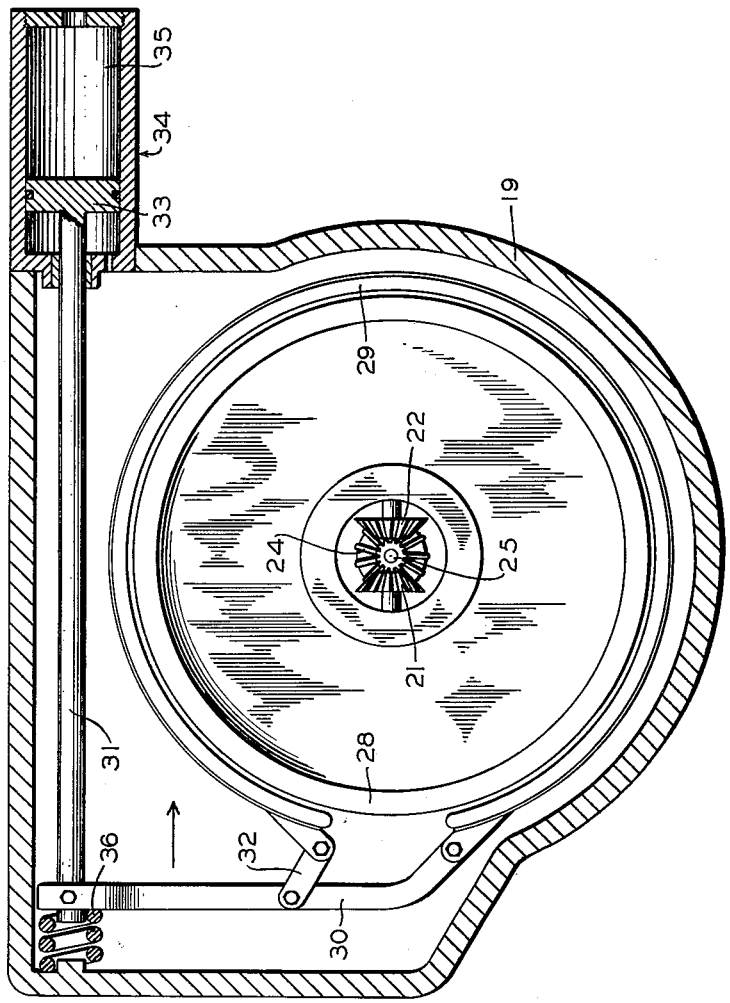

United States Patent Office 2,998,101
Patented Aug. 29, 1961

2,998,101
SAFETY BRAKE APPARATUS FOR TANDEM AXLE TRAILERS
Robert M. Kendig, Trafford, Pa., assignor to Westinghouse Air Brake Company, Wilmerding, Pa., a corporation of Pennsylvania
Filed Mar. 19, 1957, Ser. No. 647,058
9 Claims. (Cl. 188—2)

This invention relates to safety brake apparatus for vehicles, and, more particularly, to such brake apparatus, for road type trailers having tandem axles, for maintaining control of the trailer vehicle in case of failure of the conventional braking means provided on the vehicle.

Failure of braking apparatus on tractor-trailer vehicles has not been too uncommon, such failures often resulting from loss of hydraulic fluid or air pressure, in the case of fluid pressure operable brakes, or failure of conduits, brake cylinders or other parts of the brake mechanism so as to render the apparatus inoperable. In many instances emergency brake apparatus is provided for use in case of failure of the normal apparatus, but such emergency brake means usually make use of some portion of the normal brake apparatus, which may not necessarily insure that the emergency braking will be available in all instances. For example, with fluid pressure operable brakes, an emergency source of fluid under pressure, such as an additional fluid pressure storage reservoir, may be provided for availability in the event that the normal source of fluid pressure fails. If, however, the same conduits and wheel brake cylinders are employed with the emergency source of fluid pressure, possible failure of the conduits or wheel brake cylinders will render the emergency braking provision as useless as the inoperable normal braking system.

Accordingly, the principal object of the invention is to provide an emergency, or safety brake apparatus which is operable to effect braking in an emergency situation without employing a portion of any other braking system on the vehicle, to thereby insure that braking for the vehicle will be available in all situations.

For the purpose of meeting the requirements of the objective above described, the invention herein disclosed, particularly for use with tandem-axle highway trailer vehicles, provides an emergency brake apparatus for assuring a brake application on the non-power drum wheels of a trailer vehicle, notwithstanding failure of any operating part in the normal braking system provided therefor by establishing a driving connection between one set of non-power driven wheels and another set of non-power driven wheels of a trailer vehicle through a differential gear type drive-connecting mechanism, so as to cause one set of wheels to exert a force tending to rotate the other set of wheels at a speed different from that corresponding to the linear speed of travel of the vehicle, thus establishing a mutual retardation or braking effect on the two sets of wheels.

Other objects and advantages of the invention will become more apparent from the following more detailed description thereof when read in conjunction with the accompanying drawing wherein:

FIG. 1 is a diagrammatic plan view, partly in section and partly in outline, of a safety braking apparatus embodying the invention, and FIG. 2 is a view, (taken along line 2—2 of FIG. 1 and looking in the direction of the arrows,) showing further details of a portion of the safety braking apparatus.

*Description and operation*

The arrangement in FIG. 1 is that for a trailer vehicle having two pairs of wheels 1, only portions of said wheels being shown, arranged in tandem fashion on parallel, non-rotative hollow axle housings 2 and 3, the wheels being mounted conventionally at each end of said housings for rotation.

Each of the axle housings 2 and 3 also serves to house differential gear units 4 and 5 in casings 6 and 7 forming part of said axle housings 2 and 3, respectively. The axle housings 2 and 3, and therefore the respective wheel units associated therewith, are independently sprung in conventional manner to permit each axle housing and its respective wheel unit to move independently of the other in absorbing road shocks. Only differential gear unit 4 is shown in complete sectional view, while gear unit 5 is shown in a broken-away view, it being understood that both gear units are similar in structure with the exception that a pinion gear 8 associated with gear unit 4 is larger in diameter and has more teeth than a pinion gear 9 associated with gear unit 5 for a purpose to be hereinafter described. For the purpose of the invention it is immaterial which of the pinions 8 or 9 is the larger and has more teeth than the other.

Each of the differential gear units 4 and 5 is of the usual type and comprises the typical arrangement of a ring gear 10 associated with a gear spider 11, the spider comprising two side gears 12 and 13, mounted on the ring gear 10 in opposite and facing relation to each other, and two axle gears 14 and 15 in opposite and facing relation to each other and meshing with said side gears. Each of the axle gears 14 and 15 is carried by one end of respective wheel axles 16 and 17 extending through the axle housing 2, the other ends of said axles being splined or keyed to the hub of respective wheels 1 for rotation therewith. The ring gear 10 is journaled on one of the axles, axle 16 for example, for support and is rotatable independently thereof. It should be understood that gear unit 5 is similarly provided with a gear spider and the two wheel axles, not shown in detail.

An intermediate differential gear unit 18 is provided between and connected to the gear units 4 and 5, said gear unit 18 being shown in the drawing as carried in a casing 19 bolted, for example, to casing 7 of gear unit 5 or otherwise suitably supported. Gear unit 18 is also provided with a typical gear spider 20 comprising two side gears 21 and 22 and two other gears 23 and 24, which in this case are mounted at one end of respective shafts 25 and 26. At the end of said shaft 26 opposite gear 23 the pinion 9 of gear unit 5 is secured so that pinion 9, shaft 26 and gear 23 are rotatable as a unit. Due to relative motion between axle housings 2 and 3, as above described, shaft 25 is connected, through a suitable flexible coupling, such as a universal joint (not shown), to a shaft 27 which has the pinion 8 of gear unit 4 mounted at the end thereof so that gear 24, shafts 25 and 27, and pinion 8 are also rotatable as a unit.

The gear spider 20 of gear unit 18 is carried by a rotatable element or brake drum 28, which is journaled for support on shaft 25 and is rotatable independently thereof. As will be seen more clearly in FIG. 2, a flexible metal friction element or brake band 29 having an internal brake lining of suitable composition material surrounds the periphery of the brake drum 28 and normally occupies a position out of contact with said brake drum. The brake band 29 may be anchored to the casing 19, by suitable means not shown, in such manner as to permit the band to be tightened against the brake drum 28 but at the same time prevent it from being rotated with the drum.

One end of the brake band 29 is pivotally connected to one end of a lever 30, the other end of said lever being pivotally connected to one end of a piston rod 31, as shown in FIG. 2. The other end of the brake band 29 is pivotally connected to one end of a short link 32, while the other end of said link is pivotally connected to lever 30 at a point between the two ends of said lever in such manner that upon movement of said lever in the direction of the right hand, as viewed in FIG. 2 of the drawings and as indicated by the arrow, the lever 30 and link 32 will cooperate to tighten the band 29 against the drum 28. Opposite movement of lever 30 will effect release of the band 29 on the drum 28.

The end of piston rod 31 opposite to the end connected to lever 30 is connected to a piston 33 operable in a cylinder 34. The cylinder 34 is provided with a fluid pressure chamber 35 which is connectable to the source of fluid under pressure, such as a reservoir, for the conventional braking apparatus (not shown) on the vehicle. So long as the fluid pressure in the source and, therefore, pressure in chamber 35 is at an adequate operating pressure, the piston 33 and, therefore, the rod 31 and lever 30 will be maintained in the position shown in the drawing, in which the band 29 is released from the drum 28. Upon reduction of the pressure in chamber 35, a spring 36, which is compressed between the end of rod 31 and casing 19, acts to shift the rod and piston in the direction indicated by the arrow to apply the brake band 29 to the drum 28.

In operation, assuming the trailer vehicle to be traveling or moving on a roadway, and all wheels 1 rotating at a rate of speed consistent with the linear speed of the vehicle, the ring gears 10 of both differential units 4 and 5 will rotate at substantially the same rate so that pinion 9, which is smaller than pinion 8, will be caused to rotate at a higher rate (i.e., number of revolutions per second) than pinion 8. If the vehicle is rounding a curve, the differential gears in units 4 and 5, in the well-known manner, will permit all wheels to keep rolling consistently with the linear speed of the vehicle. The different rate of rotation between pinions 8 and 9 is transmitted through gears 24 and 23, respectively, of the spider 20, and is translated through the differential to produce rotation of the brake drum 28.

If it is desired to apply a braking or retarding force to the wheels 1, a driving connection is established between the two sets of wheels associated with the respective housings 2 and 3 by tightening the brake band 29 against the rotating brake drum 28. Tightening of the brake band 29, against the rotating drum 28 may be effected either at the discretion of the operator by a manually operable valve device (not shown) for releasing fluid pressure from chamber 35 of the cylinder 34, or it may be effected automatically in response to reduction from a safe pressure of fluid at the source as reflected in chamber 35. In either case, the spring 36 acts against rod 31 and lever 30 to move said lever in the direction indicated by the arrow to thereby cause the flexible band 29 to be contracted around the drum.

Contraction of band 29 about the drum 28 will resist rotation of said drum, which resistance will be transferred by way of differential unit 18 and the pinions 8 and 9 through the differential units 4 and 5 to thereby cause a resistance to be established against rotation of wheels 1, and, in effect, establish a driving connection between the wheels on the respective axle housings 2 and 3.

Until the wheels 1 and the vehicle are brought to a stop, the wheels, by virtue of the vehicle inertia, have the tendency to continue to drive the pinions 8 and 9 at their corresponding rates of rotation. The retarded or restrained brake drum 28, however, resists such rotation of the pinions 8 and 9, and therefore, of the wheels 1. But since the pinions 8 and 9, being of different size, are driven at different rates, it follows that, in effect, the wheels on axle housing 2 will exert a force tending to resist rotation of the wheels on axle housing 3, while the latter will tend to drive the former, thereby setting up a mutual braking effect between the two wheel sets, the net effect being retardation of the vehicle until it is brought to a stop.

Having now described the invention, what I claim as new and desire to secure by Letters Patent is:

1. A safety brake apparatus for use with a highway type trailer vehicle having at least two wheel units in tandem relation and in ground contact for rotation together at varying speeds corresponding to the linear speed of travel of the vehicle, said apparatus comprising a first member rotatable at a certain rate by rotation of one of said wheel units, a second member rotatable at a rate different from said certain rate by rotation of the other wheel unit, and means for establishing a driving connection between said first and said second members in such a manner as to cause a retarding effect on both of said wheel units by action of one of said wheel units tending to rotate the other wheel unit in a direction corresponding to the direction of travel of the vehicle but at a speed different from that corresponding to the linear speed of the vehicle.

2. A safety brake apparatus for use on a highway type trailer vehicle having two pairs of ground-engaging wheel units arranged in tandem relation, said apparatus comprising a first rotary element driven by rotation of one of said pairs of wheel units at a rotational speed having a certain ratio to the rotational speed of said one pair of wheel units, a second rotary element driven by rotation of the second pair of said wheel units at a rotational speed having a ratio to the rotational speed of the second pair of wheel units different from said certain ratio, and means operative to establish a driving connection between said first rotary element and said second rotary element so as to cause a retarding effect on both of said pairs of wheel units, by action of one of said pairs of wheel units tending to rotate the other pair of wheel units at a rotational rate different than the rotational rate of the one while both pairs of said wheel units are rotating in a direction corresponding to the direction of travel of the vehicle.

3. A safety brake apparatus for use with a highway type trailer vehicle having at least two pairs of wheel units in tandem relation and all in ground contact for rotation together at varying speed corresponding to the linear speed of travel of the vehicle, said apparatus comprising a first member rotatable at a certain rate by rotation of one pair of said wheel units, a second member rotatable at a rate different from said certain rate by rotation of the other pair of said wheel units while both pairs of wheel units are rotating at the same rate relative to each other, a rotatable element, a differential gear unit for rotating said rotatable element at a speed corresponding to the differential between the respective speeds of rotation of the said first and second members and means for applying a braking effort on said rotatable element whereby a mutual braking effect is produced by one pair of wheel units on the other pair of wheel units through said differential gear unit and the respective rotatable members.

4. A safety brake apparatus for use with tandem axle vehicles, said apparatus comprising a first differential gear unit driven by a first set of vehicle wheels, a first pinion of certain diameter driven by said first differential gear unit, a second differential gear unit driven by a second set of vehicle wheels arranged in tandem relation to said first set of wheels, a second pinion of different diameter than said first pinion driven by said second differential gear unit, a rotatable braking element, a third differential gear unit driven by said first and second pinions to establish a differential of rotation for rotating said rotatable braking element, and means for braking said rotatable element to thereby cause a retarding effect on both sets of wheels, through said several differential units, by action of one set of rotating vehicle wheels tending to rotate the other set of wheels at a speed different from that corresponding to linear speed of travel of the vehicle.

5. A safety brake apparatus for use with a vehicle having two pairs of wheel units arranged in tandem fashion, said apparatus comprising a first differential gear unit driven by one of said wheel units, a second differential gear unit driven by the other wheel units, a third differential gear unit, driving means through which said third differential unit is connected to said first and second differential units, said driving means including a first pinion rotated by said first differential unit and a second pinion rotated by said second differential unit at a rate of rotation different than the rate of said first pinion, a rotatable member associated with and rotatable by said third differential unit as effected by said differential rate of rotation between said pinions, and means for opposing rotation of said rotatable member to thereby cause a retarding effect on all wheel units, through said several differential gear units, by action of one pair of wheel units tending to rotate the other pair of wheel units at a speed different from that corresponding to linear speed of travel of the vehicle.

6. The combination as defined in claim 5 wherein the first and second differential gear units each comprises a gear spider driven by the wheel units of the respective axle and a ring gear in turn driven by the gear spider, the ring gears being engaged with and driving the respective pinions, the difference in diameter between the two pinions operating to produce a rotational differential translated through the third differential gear unit for causing rotation of the rotatable member.

7. The combination defined in claim 5 wherein the means for opposing rotation of the rotatable member comprises a brake band, operable to engage said rotatable member for retarding rotation thereof, and a cylinder device connectible to and responsive to the existing pressure in a source of fluid under pressure and operable upon reduction of fluid pressure at said source below a predetermined value for operating said brake band to engage said rotatable member for causing a retarding effect thereon.

8. The combination defined in claim 5 wherein the means for opposing rotation of the rotatable member comprises braking means, spring means for applying said braking means, and a normally charged fluid pressure cylinder device for holding said braking means released against the force of said spring means and for rendering said spring operative to apply said braking means upon reduction of the pressure of fluid charging said cylinder below a certain value.

9. A safety brake apparatus for use with a highway type trailer vehicle having at least two non-rotative axle housings in tandem relation to each other, each of said axle housings having coaxially journaled therein, at opposite ends, a pair of rotatable wheel axles, with each of said axles having respective wheel units mounted for rotation therewith at the ends adjacent the outboard extremities of the axle housings, said apparatus comprising, in combination, a first differential gear unit, including a first ring gear, supported in one of said axle housings and drivingly connected to the respective pair of wheel axles therein for rotating said first ring gear at a rate determined by the relative rate of rotation of the respective wheel units, a second differential gear unit, including a second ring gear, supported in the other of said axle housings and drivingly connected to the respective pair of wheel axles therein for rotating said second ring gear at a rate determined by the relative rate of rotation of the respective wheel units, a first pinion of a certain diameter driven by and according to the rate of rotation of said first ring gear, a second pinion, of a diameter different than said first pinion, driven by and according to the rate of rotation of said second ring gear, a third differential gear unit exteriorly supported by one of said axle housings and drivingly connected to said first and said second pinions, a drum associated with and rotatable by said third differential gear unit at a rate corresponding to the existing differential rate of rotation between said first and second pinions, braking means for said drum, spring means for applying said braking means to said drum, a cylinder device having a pressure chamber normally charged with fluid under pressure, and a piston operable in said cylinder device, in response to pressure of fluid in said chamber at a value above a certain value, for holding said braking means released against the force of said spring and for rendering said spring operative, upon reduction of fluid pressure in said chamber to a value below said certain value, to apply said braking means to said drum, whereby a mutual braking effect is produced, through said several differential gear units, between the wheel units associated with said one axle housing and the wheel units associated with said other axle housing.

References Cited in the file of this patent
UNITED STATES PATENTS

| | | |
|---|---|---|
| 983,237 | Jones | Jan. 31, 1911 |
| 1,812,801 | Nus | June 30, 1931 |
| 2,415,293 | Le Tourneau | Feb. 4, 1947 |
| 2,754,805 | Beman | July 17, 1956 |

FOREIGN PATENTS

| | | |
|---|---|---|
| 1,056,147 | France | Oct. 21, 1953 |